(12) United States Patent
Shinmen et al.

(10) Patent No.: US 11,584,423 B2
(45) Date of Patent: Feb. 21, 2023

(54) STEERING WHEEL

(71) Applicants: Autoliv Development AB, Vargarda (SE); SUBARU CORPORATION, Tokyo (JP)

(72) Inventors: Shunichiro Shinmen, Yokohama (JP); Osamu Takahashi, Yokohama (JP); Kota Tatsumi, Yokohama (JP); Naoya Neriugawa, Tokyo (JP); Noriyuki Tsukada, Tokyo (JP)

(73) Assignees: Autoliv Development AB, Vargarda (SE); SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/503,683

(22) Filed: Oct. 18, 2021

(65) Prior Publication Data

US 2022/0135110 A1 May 5, 2022

(30) Foreign Application Priority Data

Oct. 29, 2020 (JP) .............................. JP2020-181549

(51) Int. Cl.
*B62D 1/06* (2006.01)
(52) U.S. Cl.
CPC ...................................... *B62D 1/06* (2013.01)
(58) Field of Classification Search
CPC ........... B62D 1/06; B62D 1/065; B62D 1/046
See application file for complete search history.

(56) References Cited

U.S. PATENT DOCUMENTS

2002/0008097 A1* 1/2002 Hobby ................... B62D 1/065
219/476
2009/0142609 A1* 6/2009 Kreuzer ..................... C09J 7/22
428/473
(Continued)

FOREIGN PATENT DOCUMENTS

DE 102006031207 B3 * 11/2007 ......... B60R 21/0132
DE 102017111297 A1 * 6/2018
(Continued)

OTHER PUBLICATIONS

Machine Translation of DE 10 2017 111 297.*
(Continued)

*Primary Examiner* — Brian J McGovern
(74) *Attorney, Agent, or Firm* — Peter W. Schroen; Bret E. Field; Bozicevic, Field & Francis LLP (57) ABSTRACT

A steering wheel is provided that is able to prevent damage to a layer adjacent to an outer surface layer due to an external force applied when a joined portion between outer surface layer material parts is finished.
In a steering wheel comprising a rim portion having a core metal and a covering portion 5 covering the core metal, and a mat material 6 provided between an outer surface material 9 and the covering portion 5 of the rim portion and having a conductive portion 7 on a part facing the outer surface material 9, and the outer surface material 9 has a joined portion 91 formed in a direction intersecting a circumferential direction of the rim portion, the covering portion 5 is provided with a groove 51 in which the joined portion 91 and a part of the mat material 6 are housed, and between the outer surface material 9 and the conductive portion 7, a sliding member 8 is interposed at least in a vicinity of the joined portion 91.

9 Claims, 11 Drawing Sheets

(56) References Cited

U.S. PATENT DOCUMENTS

| | | | | |
|---|---|---|---|---|
| 2011/0073582 A1* | 3/2011 | Morita | ............... | B62D 1/065 |
| | | | | 219/204 |
| 2015/0367875 A1* | 12/2015 | Nonoyama | ............ | B62D 1/065 |
| | | | | 219/204 |
| 2016/0375910 A1* | 12/2016 | McMillen | ............ | B62D 1/06 |
| | | | | 701/36 |
| 2017/0101123 A1* | 4/2017 | Waninger | ............ | B62D 7/222 |
| 2018/0348392 A1* | 12/2018 | Nishio | ............ | B62D 1/046 |
| 2018/0354543 A1* | 12/2018 | Nishio | ............ | H03K 17/96 |
| 2019/0016383 A1* | 1/2019 | Spencer | ............ | B60Q 3/283 |
| 2019/0291770 A1* | 9/2019 | Uematsu | ............ | B62D 1/06 |
| 2020/0001911 A1* | 1/2020 | Card | ............ | B32B 7/05 |
| 2020/0053482 A1* | 2/2020 | Nakano | ............ | H01L 41/29 |
| 2021/0028784 A1* | 1/2021 | Takahara | ............ | G01D 5/24 |
| 2021/0036438 A1* | 2/2021 | Yamashita | ............ | H01R 4/06 |
| 2021/0191540 A1* | 6/2021 | Van'tZelfde | ............ | G06F 3/044 |
| 2021/0300454 A1* | 9/2021 | Hotta | ............ | C09D 11/52 |
| 2021/0362767 A1* | 11/2021 | Minoshima | ............ | H05B 3/34 |
| 2021/0371000 A1* | 12/2021 | Nozoe | ............ | G01V 3/088 |

FOREIGN PATENT DOCUMENTS

| | | | | |
|---|---|---|---|---|
| FR | 3074459 A1 * | 6/2019 | ............ | B62D 1/046 |
| JP | 2019-202446 A | 11/2019 | | |
| JP | 2021154850 A * | 10/2021 | ............ | B62D 1/046 |
| WO | WO-2011016868 A1 * | 2/2011 | ............ | B62D 1/065 |
| WO | WO-2020194931 A1 * | 10/2020 | ............ | B62D 1/046 |

OTHER PUBLICATIONS

"Nonwoven fabric," Wikipedia Page, dated by Wayback Machine to Jun. 4, 2019, url:<https://web.archive.org/web/20190604235127/https://en.wikipedia.org/wiki/Nonwoven_fabric>.*

"Polypropylene," Wikipedia Page, dated by Wayback Machine to Jul. 15, 2019, url:<https://web.archive.org/web/20190715021306/https://en.wikipedia.org/wiki/Polypropylene>.*

"Typical Engineering Properties of Polypropylene," INEOS Olefins and Polymers USA, published Apr. 2014, url:<https://www.ineos.com/globalassets/ineos-group/businesses/ineos-olefins-and-polymers-usa/products/technical-information--patents/ineos-engineering-properties-of-pp.pdf>.*

"Friction and Friction Coefficients," The Engineering Toolbox, dated by Wayback Machine to Nov. 18, 2018, url:<https://web.archive.org/web/20181118134436/https://www.engineeringtoolbox.com/friction-coefficients-d_778.html>.*

Machine Translation of WO 2020-194931.*
Machine Translation of JP 2021-154850.*
Machine Translation of FR 3074459.*
Machine Translation of DE 10 2006 031 207.*

* cited by examiner

STEERING WHEEL

CROSS-REFERENCE TO RELATED APPLICATIONS

This nonprovisional application claims priority under 35 U.S.C. § 119(a) on Patent Application No. 2020-181549 filed in Japan on Oct. 29, 2020, the entire contents of which are hereby incorporated by reference.

FIELD

The present invention relates to a steering wheel.

BACKGROUND

In recent years, there has been a widespread use of steering wheels that are provided with a conductive layer located between an outer surface layer and a core metal and can detect whether or not a driver grips the rim portion.

For example, Japanese Patent Application Publication No. 2019-202446 discloses a steering wheel that is provided with a conductive layer made of an elastic body located between an outer surface layer and a core metal of a rim portion and that detects whether or not the driver grips the rim portion based on a change in an electrostatic capacitance between the hands of the driver and the elastic body layer while ensuring flexibility.

SUMMARY

As more and more vehicles are installed with automatic driving functions, a steering wheel is shifting its concept from being operated by a driver at all times to being operated as necessary. In accordance with such a shift, the shape of the steering wheel itself is also changing from a conventional substantially circular one to a noncircular one. Following this, an outer surface layer used for improving the design of various shapes of steering wheels also is required to be composed of many different shape parts to be sewed together.

In some cases, a sheet-like material (hereinafter referred to as an outer surface layer material) such as natural leather, artificial leather or the like is used as the outer surface layer of the rim portion. In such a case, multiple parts of the outer surface layer material are sewed together to thereby form the outer surface layer. The joined portions between the parts of the outer surface layer material are thus located in places of the rim portion. Moreover, in order to enhance the appearance, a finish is carried out in such a manner as to form a recess on a covering material for covering the core metal and to press the joined portion between the parts into the recess.

Meanwhile, when a worker presses the joined portion into the recess, the force applied from the worker to the joined portion is also transmitted to a layer adjacent to the outer surface layer (hereinafter also referred to as an adjacent layer) through the joined portion. The force applied to the adjacent layer through the joined portion may cause a damage such as distortion or the like to the adjacent layer.

Since Japanese Patent Application Publication No. 2019-202446, however, only takes into account the use of a coating layer as an outer surface layer of the rim portion and does not take into account the use of the outer surface layer material above-mentioned, it cannot solve such a problem.

In consideration of the above-mentioned circumstances, it is an object of the present invention to provide a steering wheel that is able to prevent a layer adjacent to an outer surface layer from being damaged due to an external force applied when joined portions (seam portions) of the outer surface material formed in places to form the outer surface layer is finished, which is provided to improve the design of the steering wheels with various shapes.

A steering wheel according to the present invention comprises: a rim portion having a core metal and a covering portion covering the core metal; and a mat material provided between an outer surface material and the covering portion of the rim portion and having a conductive portion on a part facing the outer surface material, and the outer surface material has a joined portion formed in a direction intersecting a circumferential direction of the rim portion, the covering portion is provided with a groove in which the joined portion and a part of the mat material are housed, and between the outer surface material and the conductive portion, a sliding member is interposed at least in a vicinity of the joined portion.

According to the present invention, it is possible to prevent a damage to a layer adjacent to the outer surface layer due to an external force applied when a joined portion of a outer surface layer material is finished. Even, with the spread of autonomous vehicles, steering wheels corresponding to various hands-on/hands-off scenes are shown up and more disadvantageous structural environment for the adjacent layers appears, a durability of the adjacent layers may be enhanced.

The above and further objects and features will move fully be apparent from the following detailed description with accompanying drawings.

DETAILED DESCRIPTION

A steering wheel according to an embodiment of the present invention will be described below in detail with reference to the drawings.

Figure 1:
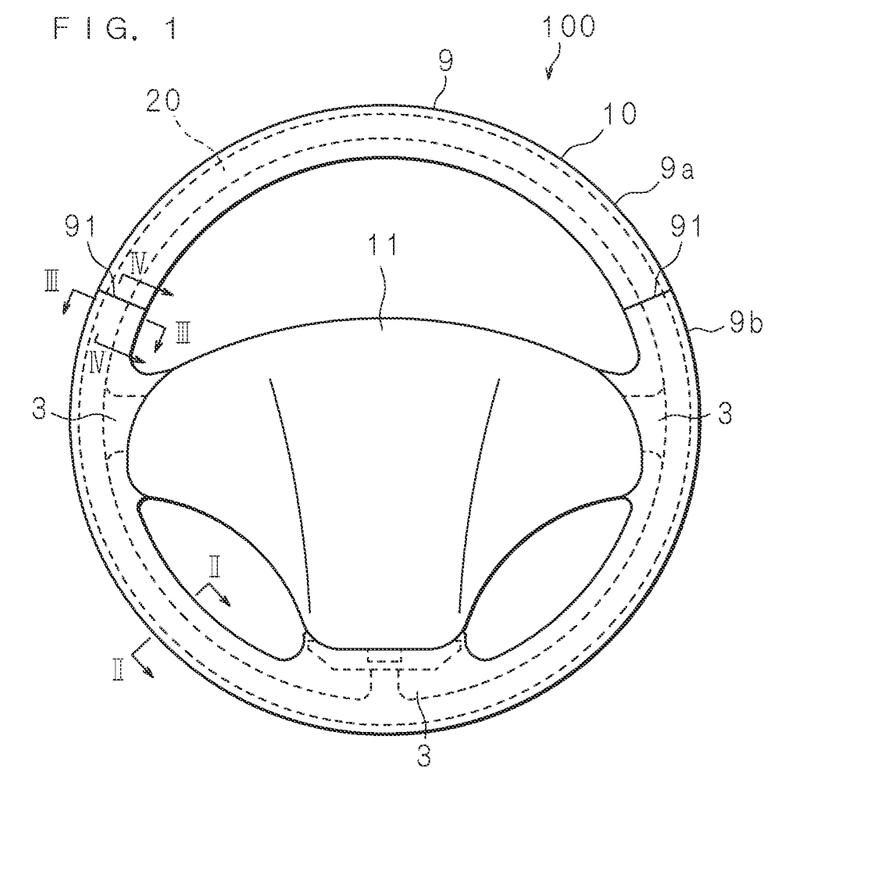
FIG. 1 is a front view of a steering wheel according to a present embodiment.

FIG. 1 is a front view of a steering wheel 100 according to a present embodiment.

The steering wheel 100 for a vehicle according to the present embodiment is provided with a ring-shaped rim portion 10 and a hub portion 11 located at the center of the rim portion 10. The hub portion 11 is connected to the rim portion 10 by three spoke portions 3. Moreover, the hub portion 11 incorporates an air bag (not illustrated).

The surface of the rim portion 10 is covered with an outer surface material 9, and the outer surface material 9 is made of natural leather, artificial leather or the like. The outer surface material 9 includes two parts of an outer surface material 9a and an outer surface material 9b. As illustrated in FIG. 1, the outer surface material 9a and the outer surface material 9b are sewed together to form a joined portion 91. The joined portion 91 is formed in a direction intersecting the circumferential direction of the rim portion 10 at two locations spaced apart in the circumferential direction of the rim portion 10.

Figure 2:
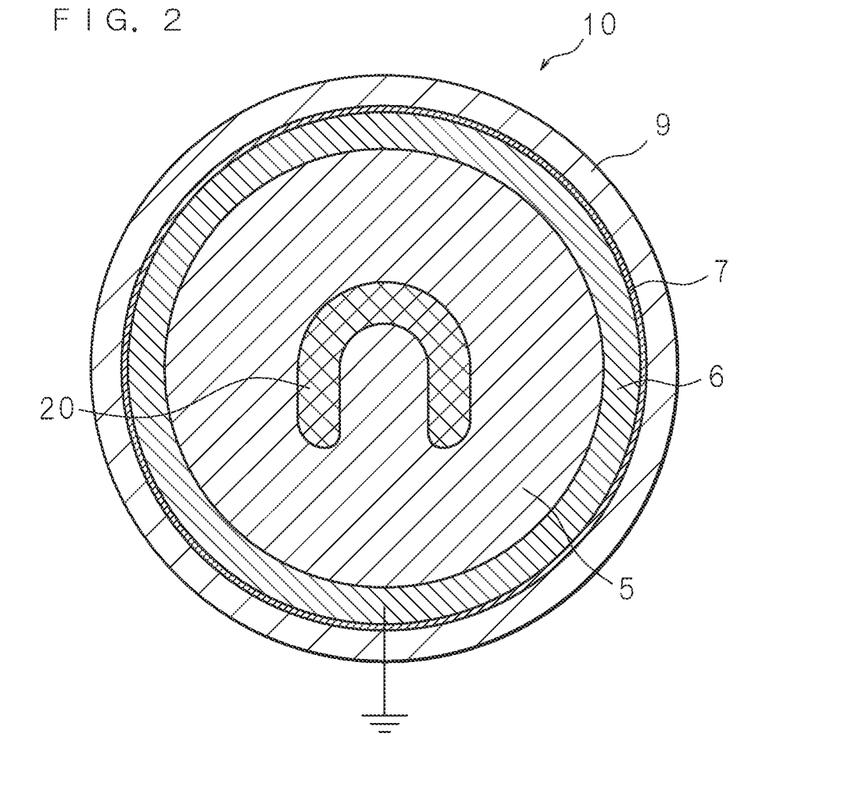
FIG. 2 is a cross-sectional view taken along line II-II in FIG. 1.
Figure 3:
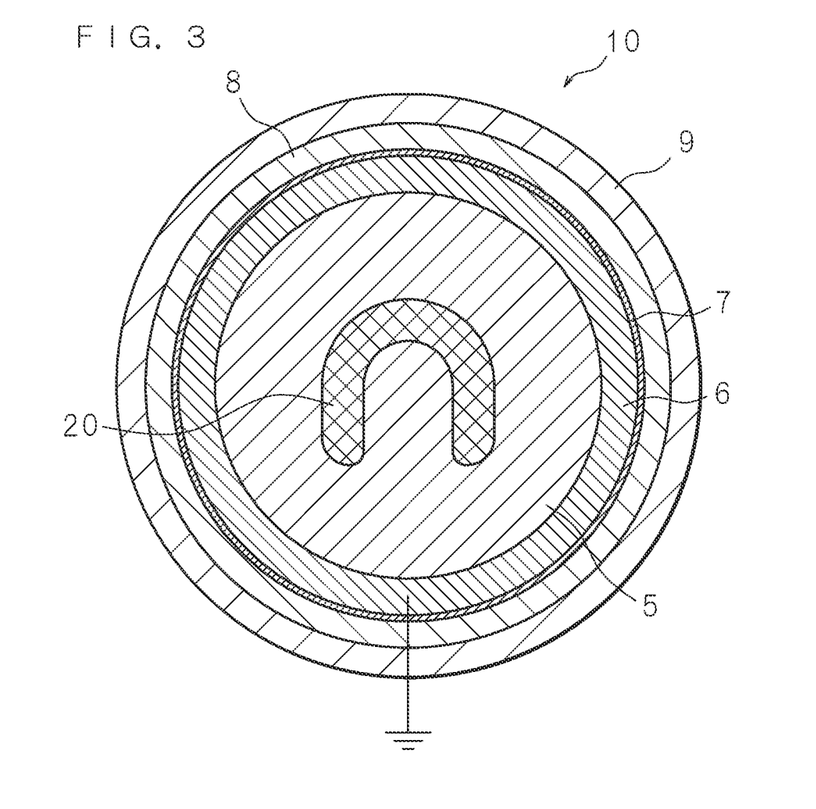
FIG. 3 is a cross-sectional view taken along line III-III in FIG. 1.

FIG. 2 is a cross-sectional view taken along line II-II in FIG. 1 while FIG. 3 is a cross-sectional view taken along line III-III in FIG. 1. FIG. 3 shows a cross section of the rim portion 10 in the vicinity of the joined portion 91 of the outer surface material 9 while FIG. 2 shows a cross section of a part in the rim portion 10 excluding the joined portion 91. FIGS. 2 and 3 show a cross section along a direction perpendicular to the axis of the rim portion 10.

The steering wheel 100 according to the present embodiment has different internal configurations depending on the positions taken in the circumferential direction of the rim portion 10 as illustrated in FIGS. 2 and 3. With first reference to FIG. 2, the internal configuration of the part in the rim portion 10 excluding the joined portion 91 will be described.

The rim portion 10 is circular when viewed in cross section and incorporates a rim core metal 20 at the central portion of the rim portion 10. The rim core metal 20 is U-shaped when viewed in cross section and is made of metal such as magnesium, aluminum or the like or an alloy. The rim core metal 20 is covered with a covering portion 5.

The covering portion 5 has insulating properties and is made of, for example, urethane, elastomer or the like. The covering portion 5 encloses the rim core metal 20 and is substantially circular when viewed in cross section.

The outer surface of the covering portion 5 is covered with a mat material 6. In other words, one main surface of the mat material 6 is in contact with the covering portion 5. The mat material 6 is made of an elastic material having flexibility. The mat material 6 is made of, for example, polyurethane, elastomer or the like. Although not illustrated, the mat material 6 incorporates a GND wire.

Furthermore, on the other main surface of the mat material 6, a conductive cloth 7 is laid. The conductive cloth 7 is a textile composed of a warp and a weft and is made of polyethylene terephthalate (PET) fibers, for example. The surface of the conductive cloth 7 is plated with a conductive material such as silver, copper, nickel or the like, which imparts conductivity to the conductive cloth 7.

Moreover, the mat material 6 and the conductive cloth 7 are covered with the outer surface material 9 as described above. In other words, the outer surface material 9 is adjacent to the conductive cloth 7 and is the outermost layer of the rim portion 10 when viewed in cross section. The outer surface material 9 is gripped and directly touched by the hands of the driver.

Hence, the part of the rim portion 10 excluding the joined portion 91 is configured such that the conductive cloth 7 and the outer surface material 9 are in contact with each other without interposing anything between them. This, however, does not apply to the vicinity of the joined portion 91. This will be described in details with reference to FIGS. 3 and 4.

Figure 4:
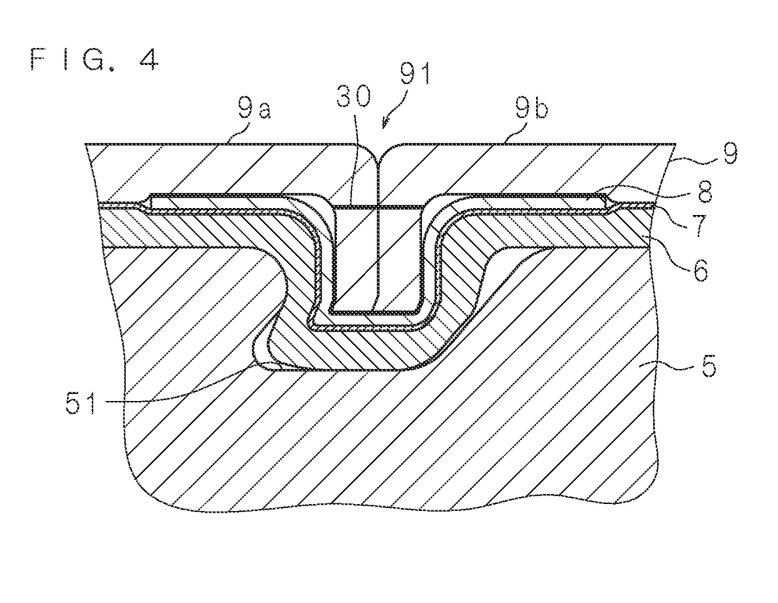
FIG. 4 is a cross-sectional view taken along line IV-IV in FIG. 1.

FIG. 4 is a cross-sectional view taken along line IV-IV in FIG. 1. FIG. 4 illustrates a cross section in the vicinity of the joined portion 91.

The rim portion 10 in the vicinity of the joined portion 91 also incorporates the rim core metal 20 at the central portion, and the rim core metal 20 is covered with the covering portion 5 having insulating properties as in the part of the rim portion 10 excluding the joined portion 91. Meanwhile, in the vicinity of the joined portion 91, a groove 51 is formed on the outer surface of the covering portion 5 in the circumferential direction of the rim portion 10. The groove 51 is substantially U-shaped when viewed in cross section and is formed obliquely relative to the radial direction of the rim portion 10.

Furthermore, as in the part of the position excluding the joined portion 91, the outer surface of the covering portion 5 is covered with one main surface of the mat material 6. The conductive cloth 7 is laid on the other main surface of the mat material 6, and the conductive cloth 7 is covered with the outer surface material 9.

Additionally, in the vicinity of the joined portion 91, a sliding material 8 is located between the conductive cloth 7 and the surface material 9. The sliding material 8 is placed over the vicinity of the groove 51 including the groove 51 of the covering portion 5 in the circumferential direction of the rim portion 10. Furthermore, the sliding material 8 is provided around an circumference of the rim portion 10 when viewed in cross section. The sliding material 8 is made of a material having a coefficient of static friction with the outer surface material 9 smaller than the coefficient of static friction between the outer surface material 9 and the conductive cloth 7. For example, the sliding material 8 is made of a nonwoven fabric.

It is noted that in the vicinity of the joined portion 91, the joined portion 91 of the outer surface material 9a and the outer surface material 9b is housed in the groove 51 together with parts of the mat material 6, the conductive cloth 7 and the sliding material 8. Here, the mat material 6 and the conductive cloth 7 extend over the entire internal surface of the groove 5. In FIG. 4, the reference code "30" denotes a seam between the outer surface material 9a and the outer surface material 9b.

The steering wheel 100 having such a configuration described above can detect whether the driver grips the steering wheel 100 or release the steering wheel 100.

More specifically, depending on a gripping force by the driver gripping the rim portion 10, the space in the radial direction between the conductive cloth 7 and the GND wire in the mat material 6 is changed, resulting in change in electrostatic capacitance accordingly. By detection of the change in electrostatic capacitance, whether or not the driver grips the steering wheel 100 is detected.

Figure 5:
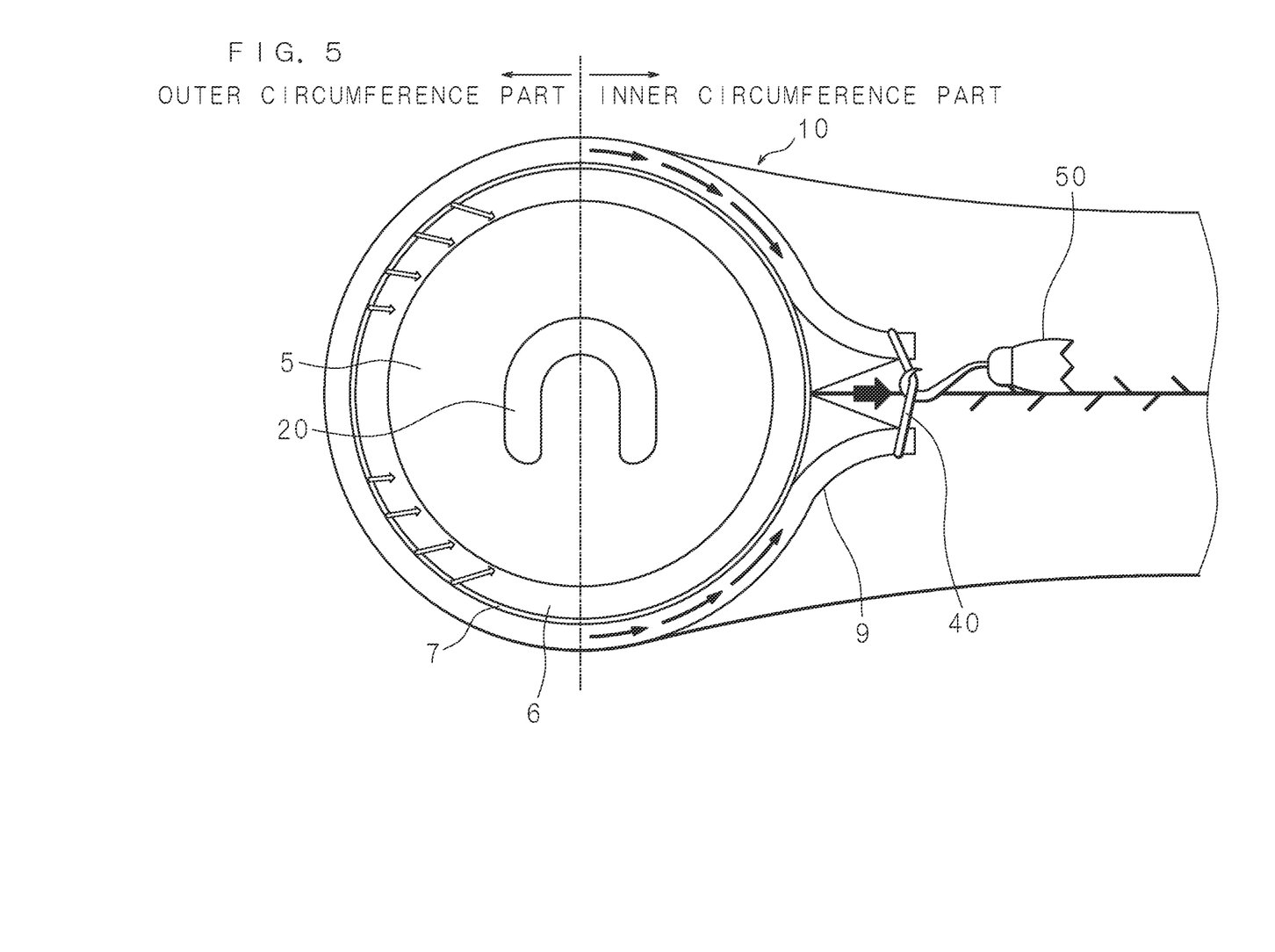
FIG. 5 is an illustrative view of the process of producing a steering wheel.

FIG. 5 is an illustrative view of the process of producing the steering wheel 100. FIG. 5 illustrates the process of sewing and finishing a sheet used for the outer surface material 9 (hereinafter referred to as an outer surface material sheet).

Upon sewing of the outer surface material sheet, sewing is performed such that a seam is arranged at an inner circumference part of the rim portion 10 in order to enhance its appearance. Such a sewing work for the rim portion 10 is performed while pulling a thread passing through both ends of the outer surface material sheet that face each other toward the inner circumference part (see arrows in FIG. 5) of the rim portion 10 using a dedicated tool 50. In other words, during the sewing work, a pulling force (hereinafter referred to as a sewing force) toward the center of the rim portion 10 is applied to both ends of the outer surface material sheet.

Hence, the sewing force acts as a tension at parts of the outer surface material sheet corresponding to the inner circumference part of the rim portion 10 when viewed in cross section, which stretches the outer surface material sheet. In FIG. 5, the tension is denoted by a black bold arrow, and the length of the arrow represents the magnitude of the tension. The sewing force acts as a pressing force to the conductive cloth 7 at parts of the outer surface material sheet corresponding to the outer circumference part of the rim portion 10 when viewed in cross section. In FIG. 5, the pressing force applied to the conductive cloth 7 is denoted by white arrows and the length of each of the arrows indicates the magnitude of the pressing force.

Moreover, after completion of the sewing work, the outer surface material sheet being stretched during the sewing work contracts by a restoring force acting thereon. Thus, the stretch and contraction of the outer surface material sheet may cause stress on the conductive cloth 7 adjacent thereto. In other words, by the friction between the conductive cloth 7 and the outer surface material 9, the conductive cloth 7 may also stretch and contract in response to the stretch and contraction of the outer surface material 9.

Meanwhile, the conductive cloth 7 is a textile and is given conductivity by a plating process as described above. However, if the conductive cloth 7 stretches or contracts in response to the stretch or contraction of the outer surface material 9, an intersection point misalignment occurs in which the warp or the weft consisting of the conductive cloth 7 is misaligned from a regular intersection point where the warp and the weft intersect. The greater the sewing force is, the larger the intersection point misalignment becomes. If such the intersection point misalignment occurs, electric conduction cannot occur at the intersection point.

The conductive cloth 7 applied with the pressing force from the outer surface material 9 may also cause damage to the warp or weft in addition to the intersection point misalignment described above.

Moreover, the pressing force from the outer surface material 9 is also transmitted to the mat material 6 via the conductive cloth 7. The mat material 6 applied with the pressing force from the outer surface material 9 causes the GND wire to protrude relatively toward the conductive cloth 7, which may increase the damage to the warp or the weft of the conductive cloth 7.

Meanwhile, upon finishing the rim portion 10, a work of pressing the joined portion 91 of the outer surface material 9 into the groove 51 is performed in order to enhance its appearance. This work makes the joined portion 91 housed in the groove 51 together with parts of the mat material 6, the conductive cloth 7 and the sliding material 8 as described above.

Figure 6:
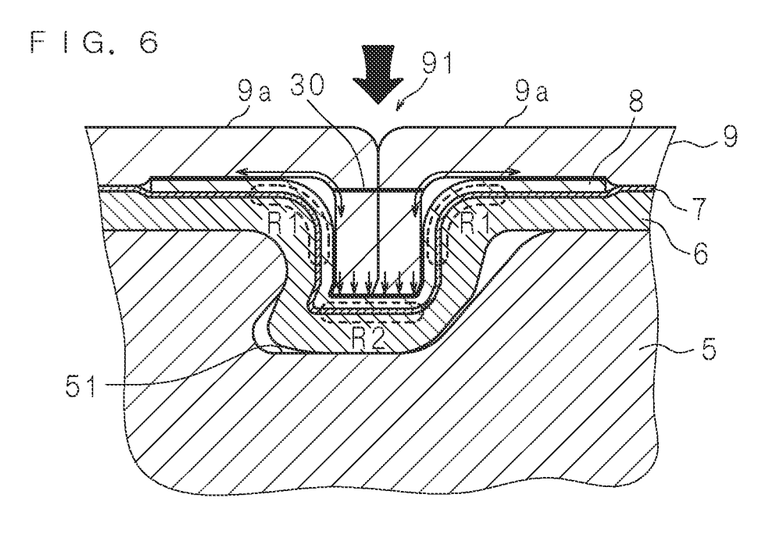
FIG. 6 is a cross-sectional view showing damage to conductive cloth due to a work of pressing a joined portion into a groove.
Figure 7:
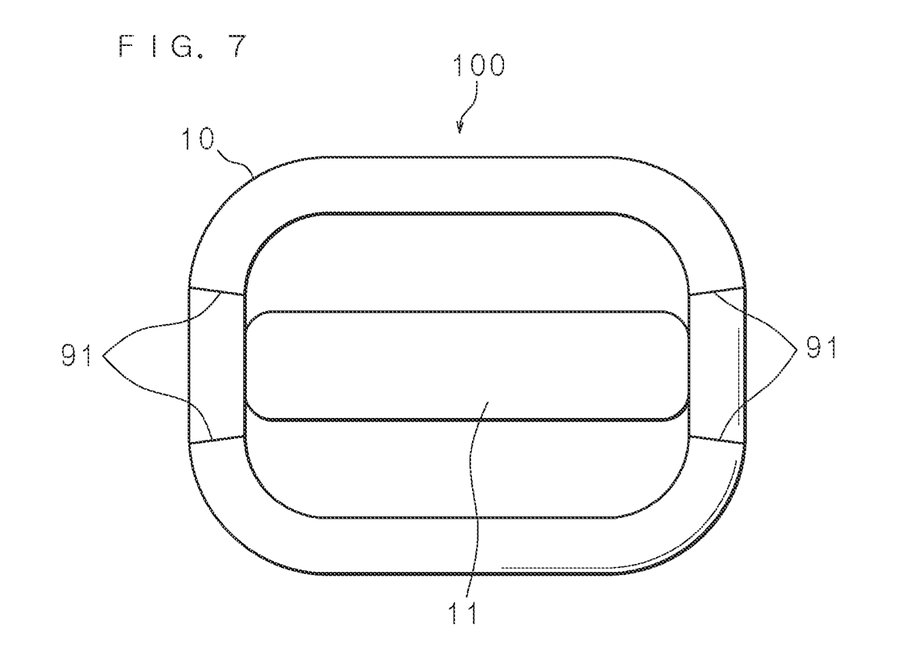
FIG. 7 is a schematic diagram exemplifying another example of the present invention.
Figure 8:
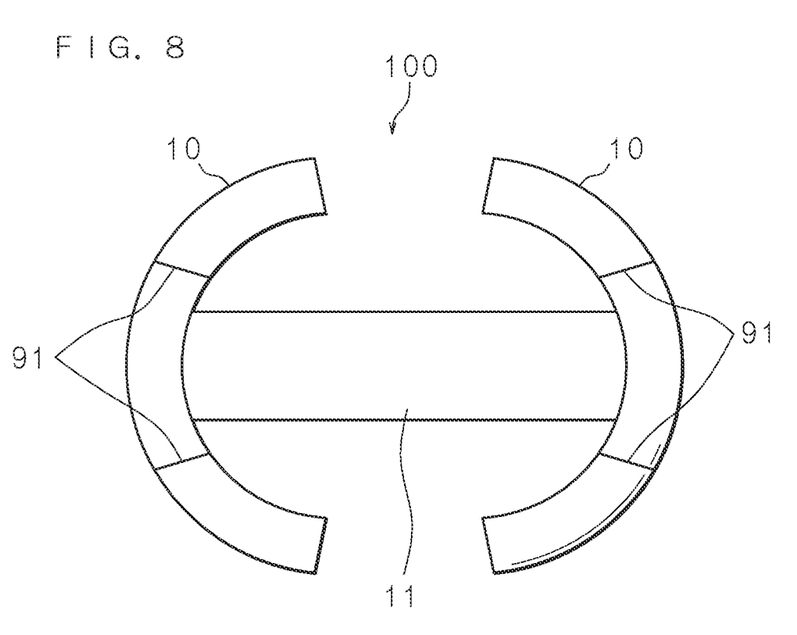
FIG. 8 is a schematic diagram exemplifying a still another example of the present invention.
Figure 9:
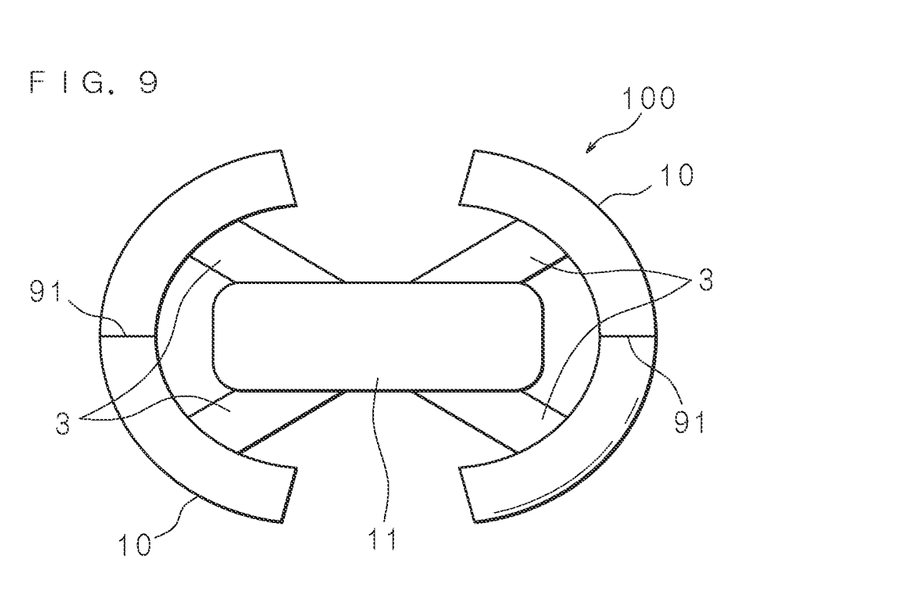
FIG. 9 is a schematic diagram exemplifying a still another example of the present invention.
Figure 10:
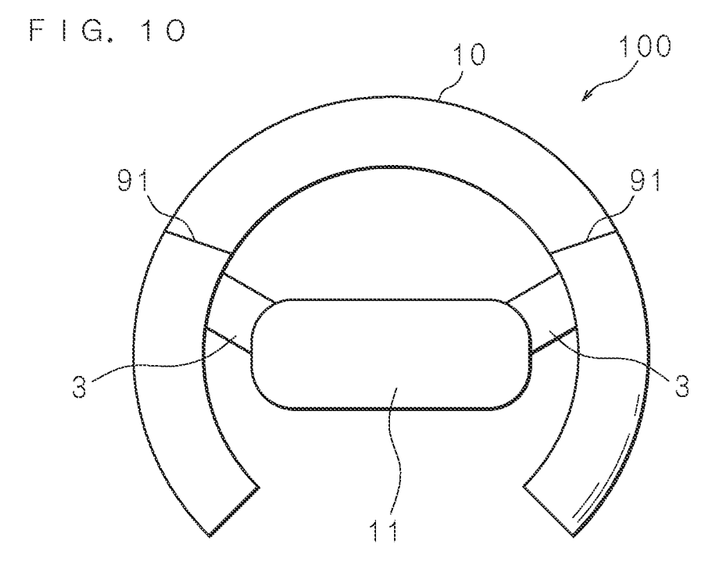
FIG. 10 is a schematic diagram exemplifying a still another example of the present invention.
Figure 11:
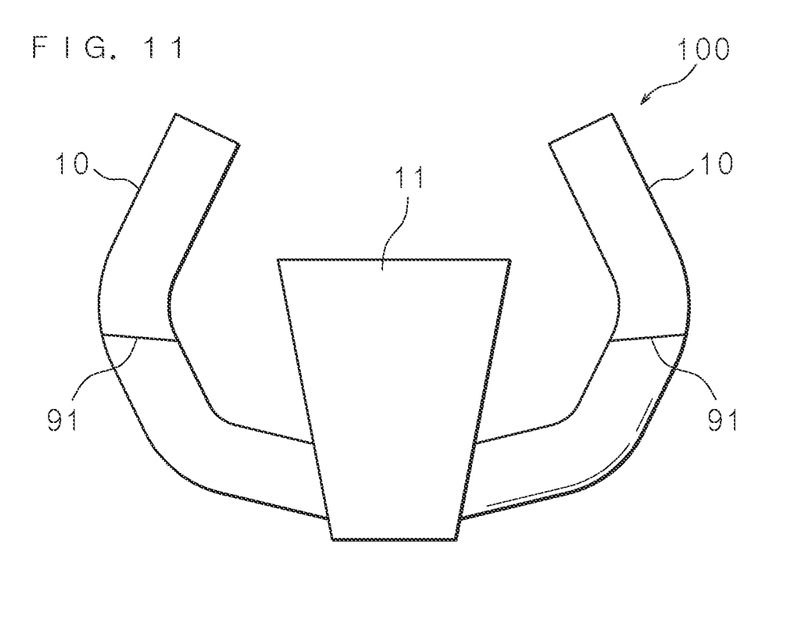
FIG. 11 is a schematic diagram exemplifying a still another example of the present invention.

Upon such a work, however, the force pressing the joined portion 91 into the groove 51 is also transmitted to the conductive cloth 7 via the outer surface material 9, so that the conductive cloth 7 is distorted and receives a pressing force. FIG. 6 is a cross-sectional view showing the damage to the conductive cloth 7 due to the work of pressing the joined portion 91 into the groove 51.

Upon the work of pressing the joined portion 91 into the groove 51 (hereinafter referred to as a pressing work), a large force is applied from the outside of the outer surface material 9 to the inside of the groove 51 (see a black bold arrow in FIG. 6). This stretches the outer surface material 9 near the seam 30 while the joined portion 91 is pressed into the groove 51. In addition, after such a pressing work, the outer surface material 9 having been stretched contracts by a restoring force acting thereon. This causes the stretch and contraction of the outer surface material 9 near the seam 30 (see arrows in solid lines in FIG. 6).

Accordingly, when the outer surface material 9 stretches or contracts, the conductive cloth 7 also stretches or contracts at a region R1 corresponding to the vicinity of the seam 30 by the friction between the conductive cloth 7 and the outer surface material 9. This may also cause the intersection point misalignment of the conductive cloth 7 as described above. In addition, the conductive cloth 7, which is curved toward the groove 51 at the region R1, may also be damaged.

Meanwhile, when the pressing work of the joined portion 91 is performed, an externally-applied pressing force is also transmitted to the conductive cloth 7 located at the bottom of the groove 51 via the joined portion 91. In other words, at a region R2 facing the direction of the externally-applied pressing force in the conductive cloth 7 (see arrows in the region R2 in FIG. 6), the warp or the weft may also be damaged.

Furthermore, the externally-applied pressing force is also transmitted to the mat material 6 via the conductive cloth 7. As the mat material 6 is applied with the pressing force, the GND wire protrudes relatively toward the conductive cloth 7 as a result, which may further increase the damage to the warp or the weft of the conductive cloth 7.

In other words, in the vicinity of the joined portion 91 of the outer surface material 9, there is a high probability of the intersection point misalignment, the distortion and the damage occurring when the pressing work of the joined portion 91 is performed, with the intersection point misalignment occurring when the sewing work sewing the outer surface sheet material is performed.

In contrast thereto, the steering wheel 100 according to the present embodiment includes the sliding material 8 inserted between the conductive cloth 7 and the outer surface material 9 in the vicinity of the joined portion 91 and is so configured that the coefficient of static friction between the sliding material 8 and the outer surface material 9 is smaller than the coefficient of static friction between the outer surface material 9 and the conductive cloth 7.

Accordingly, in the vicinity of the joined portion 91, the conductive cloth 7 is in contact with the outer surface material 9 via the sliding material 8 to thereby reduce the friction between the outer surface material 9 and the sliding material 8, which makes it difficult to transmit the stretch and the contraction (stress) occurring in the outer surface material 9 to the conductive cloth 7. This makes it possible to prevent the intersection point misalignment from occurring.

In addition, in the vicinity of the joined portion 91, the sliding material 8 is placed between the outer surface material 9 and the conductive cloth 7, so that the externally-applied pressing force during the pressing work pressing the joined portion 91 is partly absorbed by the sliding material 8 and relieved. This makes it possible to reduce the damage to the conductive cloth 7 due to the pressing force as much as possible.

As described above, in the steering wheel 100 according to the present embodiment, the joined portion 91 of the outer surface material 9 is housed in the groove 51 together with parts of the mat material 6, the conductive cloth 7 and the sliding material 8. This makes it possible to hide the joined portion 91 of the outer surface material 9 so as not to be seen, which enhances its appearance.

Moreover, in the steering wheel 100 according to the present embodiment, the groove 51 is formed obliquely relative to the radial direction of the rim portion 10. This prevents the joined portion 91 housed in the groove 51 from coming off in comparison with a case where the groove 51 is formed along the radial direction of the rim portion 10.

Though described above is an example where the sliding material 8 is provided only in the vicinity of the joined portion 91 of the rim portion 10, the present invention is not limited thereto. The sliding material 8 may be configured to be formed over the entire of the rim portion 10.

In the present invention, the outer surface material 9 may be separated irrespective of the separation direction of the outer surface material 9 (a direction of the joined portion 91 and the groove 51). In the case where the outer surface material 9 is pulled obliquely to the separation direction upon the sewing, a local tensile stress occurs. The sliding material 8 can prevent the effect of the tensile stress on the conductive cloth 7, which is applied to a portion where a stretch due to the tensile stress is undesirable.

Though described above is an example where the coefficient of static friction between the sliding material 8 and the outer surface material 9 is smaller than the coefficient of static friction between the outer surface material 9 and the conductive cloth 7, the present invention is not limited thereto.

It may be possible that the coefficient of static friction between the sliding material 8 and the outer surface material 9 is smaller than the coefficient of static friction between the outer surface material 9 and the conductive cloth 7 and the coefficient of static friction between the sliding material 8 and the conductive cloth 7 is smaller than the coefficient of static friction between the outer surface material 9 and the conductive cloth 7. In this case, not only the friction between the outer surface material 9 and the sliding material 8 is reduced but also the friction between the sliding material 8 and the conductive cloth 7 is reduced, which allows the conductive cloth 7 to be less affected by the stretch and contraction occurring in the outer surface material 9.

In addition, the steering wheel 100 is applicable irrespective of the types of vehicles and can also be applied to vehicles having automatic driving functions, for example.

Though an example of the steering wheel 100 having a ring-shaped rim portion 10 is described above, the present invention is not limited thereto. It is needless to say that the present invention is also applicable to a noncircular steering wheel having a noncircular rim portion 10, for example.

FIGS. 7 to 11 are schematic diagrams exemplifying other examples of the present invention. The steering wheels 100 according to FIGS. 7 to 11 are all provided with a noncircular rim portion 10. For convenience, FIGS. 7 to 11 represent the joined portion 91 with a solid line.

As shown in the drawings, the present invention suggests prevention of damage to the layer adjacent to the outer surface which may become more and more susceptible to damage as the automatic driving function is widely employed leading to more complicated shapes of steering wheels and many different arrangements of joined portions.

It is noted that, as used herein and in the appended claims, the singular forms "a", "an", and "the" include plural referents unless the context clearly dictates otherwise.

What is claimed is:

1. A steering wheel comprising:
   a rim portion having a core metal and a covering portion covering the core metal; and
   a mat material provided between an outer surface material and the covering portion of the rim portion and having a conductive portion on a part facing the outer surface material;
   the outer surface material has a joined portion formed in a direction intersecting a circumferential axis of the rim portion;
   the covering portion is provided with a groove in which the joined portion, a part of the mat material, and a part of the conductive portion are housed;
   a sliding member interposed between the outer surface material and the conductive portion within the groove, wherein the sliding member extends out of the groove along the circumferential axis by an amount less than the conductive portion such that the conductive portion extends circumferentially beyond the sliding member along the circumferential axis.

2. The steering wheel according to claim 1, wherein a coefficient of static friction between the sliding member and the outer surface material is smaller than a coefficient of static friction between the outer surface material and the conductive portion.

3. The steering wheel according to claim 1, wherein the conductive portion is provided over an entire internal surface of the groove.

4. The steering wheel according to claim 1, wherein the conductive portion is a textile having a metallic surface.

5. The steering wheel according to claim 1, wherein the rim portion has a circular cross section, and the groove is formed obliquely relative to a radial direction of the rim portion.

6. The steering wheel according to claim 1, wherein the sliding member is made of a nonwoven fabric.

7. The steering wheel according to claim 1, wherein the outer surface material comprises a first outer surface material portion and a second outer surface material portion.

8. The steering wheel according to claim 7, wherein the joined portion includes a seam sewn through the joined portion in order to connect the first outer surface material portion and the second outer surface material portion.

9. The steering wheel according to claim 1, wherein the mat material is made of an elastic material having flexibility.

\* \* \* \* \*